Aug. 16, 1932.  H. C. DOANE  1,872,621
BATTERY SUPPORT
Filed Oct. 7, 1927
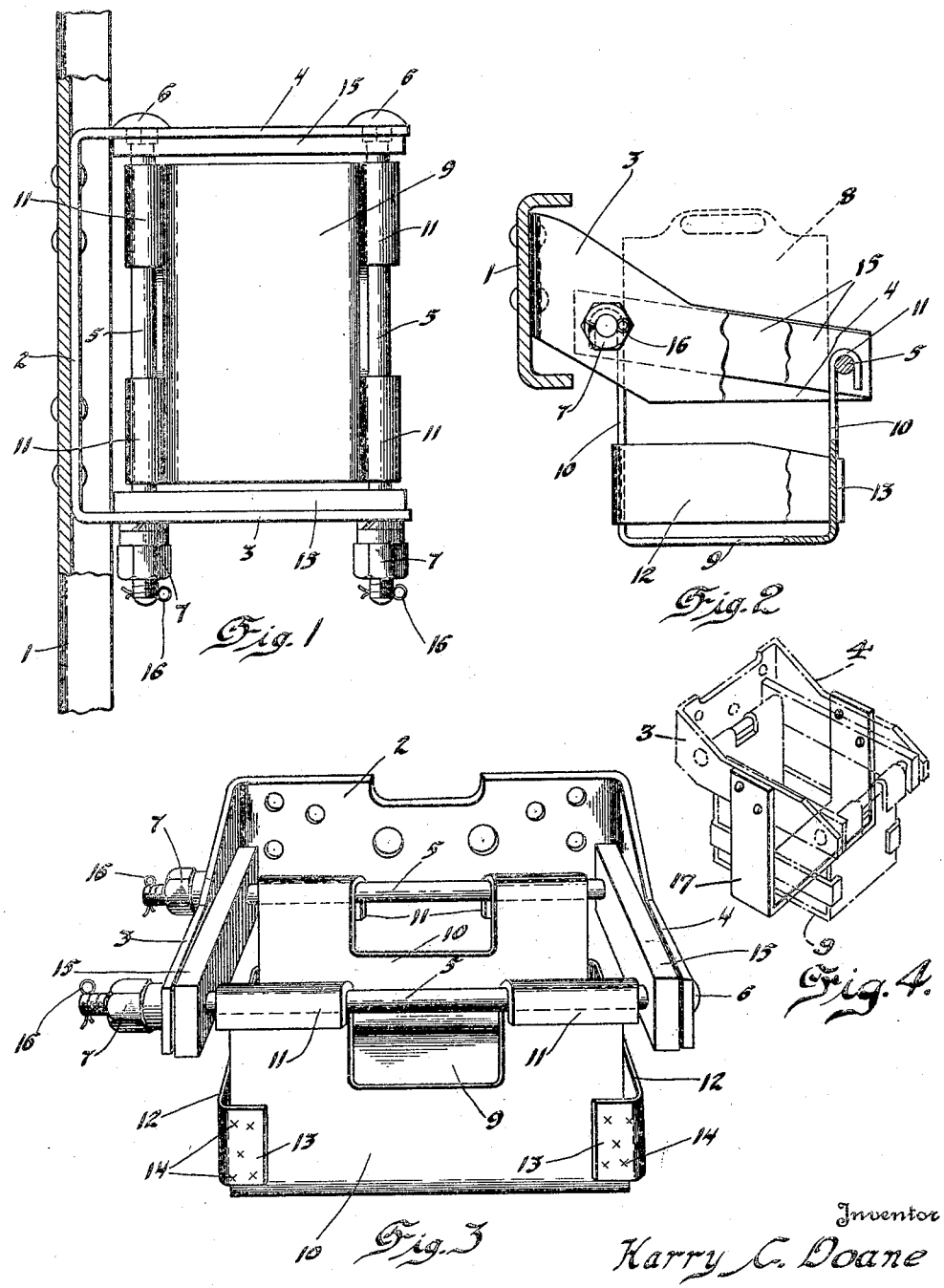
Inventor
Harry C. Doane Patented Aug. 16, 1932

1,872,621

UNITED STATES PATENT OFFICE

HARRY C. DOANE, OF FLINT, MICHIGAN, ASSIGNOR TO GENERAL MOTORS CORPORATION, OF DETROIT, MICHIGAN, A CORPORATION OF DELAWARE

BATTERY SUPPORT

Application filed October 7, 1927. Serial No. 224,649.

This invention relates to improvements in supports for mounting a storage battery on a motor vehicle.

It is among the objects of the invention to provide a rugged battery support of few parts, which will be simple and economical to manufacture, and at the same time capable of withstanding hard usage.

A further object of the invention is to provide a construction which will securely support the battery in a fixed position, while permitting ready removal and replacement of a battery therein.

A further object of the invention is to utilize a box-like receptacle or cradle for supporting the weight of the battery, which will protect the battery against injuries such as are caused by flying stones, splashed water and heat from the exhaust pipe of an internal combustion engine, which in some motor vehicles extends beside the support.

A still further object of the invention is to provide a battery support which may be easily disassembled to permit replacement of damaged parts or the free accessibility for performing certain operations on the chassis.

Other objects and advantages will be apparent from the following specification taken in connection with the accompanying drawing in which Figures 1, 2 and 3 are respectively, a top plan view, a side elevation partly broken away, and a perspective view of the battery support forming the subject matter hereof, and Figure 4 is a detail perspective view on a small scale illustrating a modification.

Referring more particularly to the drawing, illustrating a preferred embodiment of the invention, the reference character 1 indicates one of the longitudinal side members of the chassis frame of a motor vehicle, which following general practice is shown as of channel shape, and by which the present battery support is carried. Secured to the vertical web of the chassis frame 1 is a bracket preferably consisting of a flat member 2, adapted to be riveted, bolted or otherwise fastened to said web, the ends of which are turned substantially at right angles thereto, to constitute a pair of laterally extending arms 3 and 4, spaced from each other a distance approximating the size of the battery to be supported. Long bolts 5—5 having enlarged heads 6 on one end, and nuts 7 adjustably screw threaded on the other end, pass through apertures or openings in the arms, so as to extend along either side of the battery 8 inserted between the arms. Suspended from the long bolts 5—5 is a box-like receptacle comprising a U-shaped member having a bottom 9 and sides 10—10, the upper ends of the sides being reversely turned outwardly and downwardly to form hooks 11, by means of which the weight supporting member is hung on the long bolts. To brace the U-shaped member, particularly against side sway, and to close the ends thereof, there may be provided end plates or straps 12, having ears 13, welded as at 14, or otherwise secured to the upstanding side portions 10. The weight of the battery to be removably carried by the support, is received upon the bottom 9 of the box-like receptacle suspended upon the bolts 5—5, and in order to firmly hold the battery in place, the nuts 7 are drawn up, to inwardly flex or contract the arms 3 and 4 against the vertical sides of the battery, obviating any need for the customary hold down clamps. Shims 15, preferably of wood, to afford an effective clamp surface, may be removably inserted between the sides of the battery and the resilient arms so as to permit the use of the support with various lengths of batteries.

Adjacent the extremity of the screw threaded end of each long bolt 5, a cotter pin 16 extends thru a transverse opening in the long bolt. These pins are located a sufficient distance from the nuts 7—7 to permit removal of the battery when the nuts are threaded back. Their purpose is to prevent complete removal of the nuts or their accidental loss in the case of failure to properly tighten the nuts when the battery is installed. It will be apparent that if some provision of this nature were not made, the long bolts due to vibration in travel would have a tendency to work out of the openings in the arms and allow the battery supporting cradle to drop.

Since the suspension of the cradle is such as to permit its ready removal, replacement may be easily made in the case of damage thereto, as sometimes occurs from the effects of acids spilled from storage batteries, impacts with obstructions in the road, and vehicular collisions. This arrangement is found to have distinct advantages over battery supports heretofore used, wherein the member which bears the weight of the battery is usually riveted in place, making the exchange of this part difficult should replacement be necessitated. It possesses still further advantages in that removal of the cradle permits the arms to be bent back to any desired position to accommodate the performance of certain operations on the chassis, which heretofore necessitated taking the battery completely out of the chassis by removal of the fastening rivets.

In addition to suspending the weight supporting member on the long bolts an additional U-strap 17 as shown in Figure 4 may be riveted to the arms 3 and 4 and passed under the bottom 9 so that one weight carrying member may augment the other, as a safety precaution when the vehicle is subjected to unusually hard usage.

While the above description has been more or less specific, it is to be understood that the invention is not limited to the exact details, but that various modifications may be made as come within the scope of the appended claims.

I claim:

1. A mounting for storage batteries, including a pair of spaced arms adapted to be carried by a chassis frame member and to extend laterally therefrom, tie bolts connecting said arms and extending on opposite sides of the battery and a U-shaped cradle having hooks formed at the upper ends thereof for engagement with said bolts and being adapted to support the weight of a battery placed therein.

2. A mounting for storage batteries, including a bracket adapted for attachment to a vehicle chassis frame member and having a pair of spaced laterally projecting arms, between which a battery is to be placed, a pair of long bolts adapted to extend on either side of the battery and to hold said arms in gripping engagement with the sides of the battery, and a box-like receptacle suspended from said bolts for supporting the weight of the battery clamped between said arms.

3. A mounting for storage batteries, including a bracket adapted for attachment to a vehicle chassis frame member and having a pair of spaced laterally projecting arms, between which a battery is to be placed, a pair of long bolts adapted to extend on either side of the battery and passing thru alined openings in the arms, adjustable nuts engaged on said bolts to draw the arms into gripping engagement with the sides of the battery, means to prevent complete disengagement of the nuts from the bolts without interfering with their adjustment thereon, and a battery supporting member suspended from said bolts.

4. Means to mount a storage battery on a motor vehicle or the like, including a box-like receptacle adapted to receive the battery and support the weight thereof, a pair of spaced clamping members carried by the vehicle and adapted to grip opposite sides of the battery to hold the same in said receptacle and a pair of tie bolts connecting said clamping members and suspending said receptacle therefrom.

5. A storage battery mounting for motor vehicles and the like, wherein a pair of tie bolts adjustably connect a pair of spaced arms carried by the vehicle for clamping a battery therebetween, characterized by a receptacle to support the weight of the battery clamped between said arms, having hooked side extremities adapted to fit said bolts to removably suspend the same therefrom.

6. A storage battery mounting for motor vehicles and the like, wherein a pair of tie bolts adjustably connect a pair of spaced arms carried by the vehicle for clamping a battery therebetween, characterized by a receptacle to support the weight of the battery clamped between said arms, having means associated therewith for engagement with said bolts to removably suspend the receptacle therefrom.

7. In a structure of the class described, in combination, a relatively stationary support, a pair of horizontal arms fastened thereto and extending at right angles therefrom, said arms being disposed in spaced parallelism, a substantially U-shaped hanger carried by and depending from said arms, and clamping bolts associated with said arms for firmly fastening a battery between the arms and in said hanger, together with a removable supplemental repair hanger adapted for disposition in said first named hanger and between the bolts and arms.

8. In a storage battery hanger repair supporting arm, a substantially U-shaped hanger carried by and depending therefrom, clamping bolts associated with said arm, said clamping bolts being disposed in a horizontal plane, a repair hanger adapted for disposition within said first named hanger and including upstanding end walls provided with supporting means for resting on said bolts.

9. In combination with a motor car frame provided with a battery support in which a pair of arms project transversely from the frame and a pair of transversely spaced tie elements extend between said arms, of a cradle comprising a base portion adapted to provide a rest for a battery, a pair of upright portions to receive the battery therebetween and laterally projecting means associated with the upright portions to removably mount the cradle on said tie elements.

10. In a structure of the class described, in combination, a relatively stationary support, a pair of horizontal arms fastened thereto and extending at right angles therefrom, said arms being disposed in spaced parallelism, a substantially U-shaped hanger carried by and depending from said arms, clamping bolts associated with said arms for firmly fastening a battery between the arms and in said hanger, and a cradle suspended from said clamping bolts and braced by said hanger.

11. A battery holder adapted for attachment to a support including a pair of laterally projecting brackets, a pair of spaced tie elements extending between said brackets, a substantially U-shaped hanger carried by and depending from said arms and a cradle suspended from said tie elements and braced by said hanger.

In testimony whereof I affix my signature.

HARRY C. DOANE.